United States Patent [19]

Disclaire et al.

[11] 4,449,288
[45] May 22, 1984

[54] PROCESS FOR MAKING A WINDING FOR A LOW-POWER ALTERNATOR STATOR

[75] Inventors: Jacques Disclaire, Charbonnieres; Claude Mignotte, Saint Priest, both of France

[73] Assignee: Societe de Pariset du Rhone S.A., Lyons, France

[21] Appl. No.: 267,452

[22] Filed: May 27, 1981

[30] Foreign Application Priority Data

May 30, 1980 [FR] France .................. 80 12475

[51] Int. Cl.³ .................................... H02K 15/06
[52] U.S. Cl. .................................. 29/596; 29/736; 310/184
[58] Field of Search ............... 29/596, 598, 732, 736, 29/734; 140/92.1, 92.2; 310/184

[56] References Cited

U.S. PATENT DOCUMENTS 3,949,464  4/1976  Walker .................. 29/596
4,357,968  11/1982  Kieffer .................. 140/92.1

Primary Examiner—Carl E. Hall
Attorney, Agent, or Firm—Browdy and Neimark

[57] ABSTRACT

A process making it possible to manufacture and locate a winding of an undulating shape, more especially for an alternator stator of a motor vehicle.

Initially externally of the stator and for each phase, a circular flat coil is formed having the desired number of turns. This coil is then preformed, still externally of the stator, so as to give it an undulating flat star shape, whose undulations correspond to the number of poles and notches of the stator. Then this preformed coil is moved against the bundle of sheets of the stator and wires are inserted into the notches by preforming a tilting action which deforms the coil out of its plane. The apparatus for practicing the process of insertion by tilting particularly comprises a mandrel, which is introduced into the bundle of sheets along the axis of the stator.

4 Claims, 4 Drawing Figures

PROCESS FOR MAKING A WINDING FOR A LOW-POWER ALTERNATOR STATOR

Field of the Invention

The present invention concerns a process and a device for making the winding of an alternator stator of low power, and relates, more especially, to the manufacture of alternators for motor vehicles.

BACKGROUND OF THE INVENTION

The alternator stator of low power, such as is used in the equipment of motor vehicles, is usually formed by a stack of crownlike thin sheets, whose internal cylindrical face is equipped with notches intended to receive the phase windings, which generally number three. The most widely used windings of alternator stators of this type are either formed by coils closed on themselves and crisscrossed which encircle the poles, or of the so-called "undulating" type, known for example from French Pat. Nos. 1532522 and 2408937. It is the making of this latter type of winding which relates, more particularly, to the process of the present invention.

The windings considered here are either made "in situ," i.e., in the stator itself, by special machines, or formed externally of the stator and then placed in the notches of the stator. In a general way, these processes of making the windings are quite slow and therefore costly, because numerous long and complex operations are necessary. In both cases, the "rectangular" or "lengthwise" shapes of the coils or loops of the winding impose accelerations and decelerations during the process of mechanical shaping and results in a wire drawing effect, varying with the shape and tension given to these wires. To limit this drawing, it is necessary to reduce the speed of the machines used. Furthermore, this drawing makes it very difficult to use wires especially of aluminum or light alloy, which can withstand only a slight drawing.

Furthermore, the known process which involves shaping the coils externally of the stator, then inserting them into the notches, is difficult to use in the case of alternator stators with small inner diameters, because it is necessary to accomodate, on the inside of a free space of a very limited diameter, the whole of a complex equipment for preforming winding and/or expansion which again complicates the machines and increases their cost and fragility.

Moreover, the known processes which have just been mentioned make it difficult, or at least uneconomical, to make stators with separate phase windings; actually, in this case it is necessary to use a separate machine for each kind of winding and also to transfer the stators during the manufacture from one machine to another.

OBJECTS AND SUMMARY OF THE INVENTION

The present invention aims to remedy the difficulties and inconveniences previously shown. Its aim is thus to provide a process and a device to make in an automatic, simple, quick and economical way the winding of alternator stators, while not causing the drawing of wires thus allowing the possible use of aluminum or light alloy, also an intended result being to be able to wind in a simple way windings of different types on the same stator.

To overcome these problems, the invention has essentially as its object the practice of a process to make a winding of an undulating type, characterised in that:

there is formed, externally of the stator and for each phase, a coil initially flat and circular having the desired number of turns, this coil is preformed still outside the stator, so as to give it an undulating star shape, still substantially flat, whose undulations correspond to the number of poles and notches of the stator, this coil preformed into an undulating star shape is moved against an end face of the bundle of sheets of the stator and wires are inserted into the notches of this bundle of sheets by tilting, which deforms the coil out of its plane towards the other end face of the bundle of sheets.

It should be noted that, if this process involves the initial shaping of flat coils corresponding to a phase, the operation to put the wires into the notches of the bundle of sheets in place by tilting can be either simultaneous, or performed separately in different phases.

The formation, in the first stage of the process, of a flat coil of circular shape, allows the coiling of the wire at a high speed, thus is less costly, with quite a low and constant tension, and without drawing. The preforming into an undulating star shape is also feasible, by using appropriate means, without drawing. The absence of the drawing of wires permits a greater consistency of characteristics to be obtained and permits the use of aluminum wires and a light alloy. Another important advantage of the process according to the invention is that it allows the formation of stators possessing different phases through the section of their conductors, through their number of turns or the material of their conductors, these possibilities being or not being cumulated without complicating the operations or making it necessary to use several machines. The preforming allows the shape of the bundles of coils to be easily varied; particularly, the coil can be initially made in a conical shape, while conserving a general flat shape, to obtain spaced bundles which limit the overlap between phases and improve cooling. The process according to the invention facilitates the wiring because it allows the leadout connection from the preforming to be arranged at will, to make all arrangements facilitating the connections of the different phases; the insertion of a more or less high number of phases does not involve any complication in the operation of the process. Finally, this process allows the automatic placement of the closing keys of the notches, simultaneously with the insertion of the wires in the notches by tilting; thus the stator comes out of the machine practically finished, without necessitating the provisional placement of holding parts, and only the impregnation and connection remaining to be done which represents additional simplification and economy.

The apparatus specially envisaged by the present invention which is intended to put into operation the process for the making of the winding of an alternator stator which has just been defined, includes, in addition to a machine with means capable of forming flat and circular coils, on the one hand, means, in particular, such as resilient pins able to deform circular and flat coils into coils having an undulating star shape and on the other hand a mandrel able to be moved along the axis of the stator, being introduced into the bundle of sheets, so as to insert by tilting, into the notches of this bundle of sheets, the wires of the winding preformed into an undulating star shape. Advantageously, the apparatus further comprises means able automatically to move the coil, preformed into an undulating star shape against the bundle of sheets.

The invention also embodies an alternator stator of low power and more especially an alternator stator, for motor vehicles including winding of an undulating type made according to the process described above.

BRIEF DESCRIPTION OF THE DRAWINGS

In any case the invention will be better understood with the aid of the description which follows by referring to the attached diagrammatic drawing illustrating, by way of a non-restrictive example, the stages of the process for making the winding of an alternator stator according to the invention and showing primarily a device aimed to put this process into operation.

DETAILED DESCRIPTION OF PREFERRED EMBODIMENTS

Figure 1:
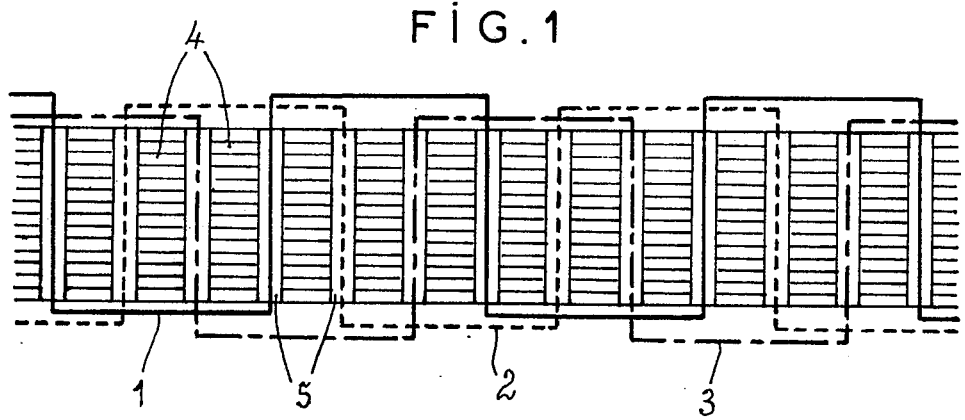
FIG. 1 is a detailed view of a three-phase winding of the undulating type made and positioned according to the invention.

FIG. 1 shows, partially and in a detailed form, the three phases 1, 2, 3 of a winding of an undulating type of a three phase alternator stator, made according to a diagram which is known to the prior art. There has been indicated diagrammatically as 4, the bundle of sheets and as 5 the notches in which the wires are inserted.

Figure 2:
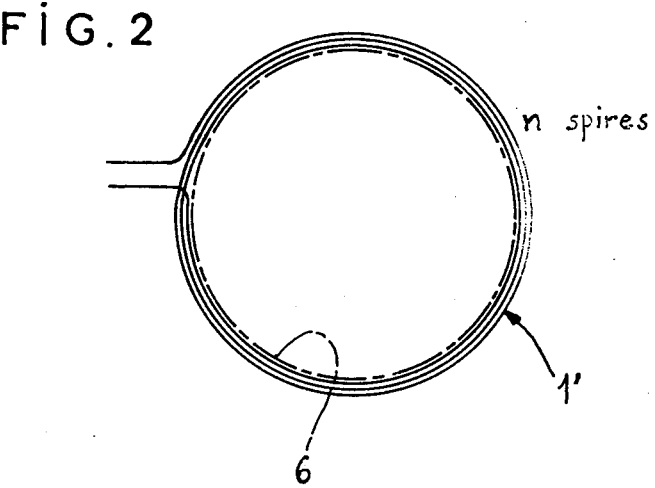
FIG. 2 shows, in front view, the flat and circular coil formed in a first stage of the process and corresponding to a phase.

For example, to make phase 1, first of all n turns are wound around a circular core 6, as is shown in FIG. 2, so as to obtain a flat and circular coil designated by 1'; n corresponding to the number of conductors through notch 5 on the finished stator.

Figure 3:
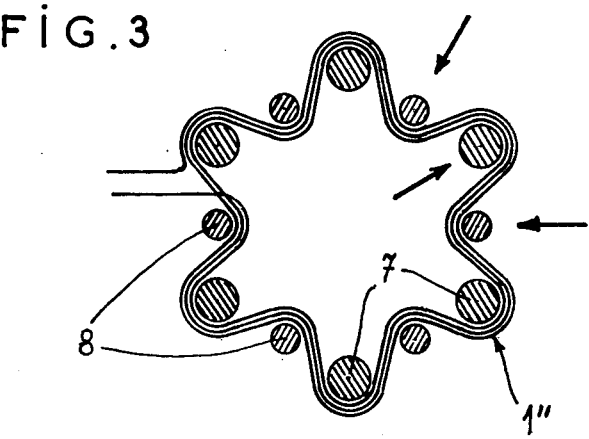
FIG. 3 illustrates the shaping operation, from the coil, according to FIG. 2, to form a winding in an undulating star shape.

The following operation, illustrated in FIG. 3, accomplishes preforming during which two series of resilient mobile pins, respectively 7 and 8 give the initially flat and circular coil 1' a flat undulating star shape. This coil thus preformed into a star shape, designated by 1" includes for example six arms, for a three-phase alternator stator with 35 notches. More generally, the number of arms or undulations is chosen to correspond with the number of poles.

Figure 4:
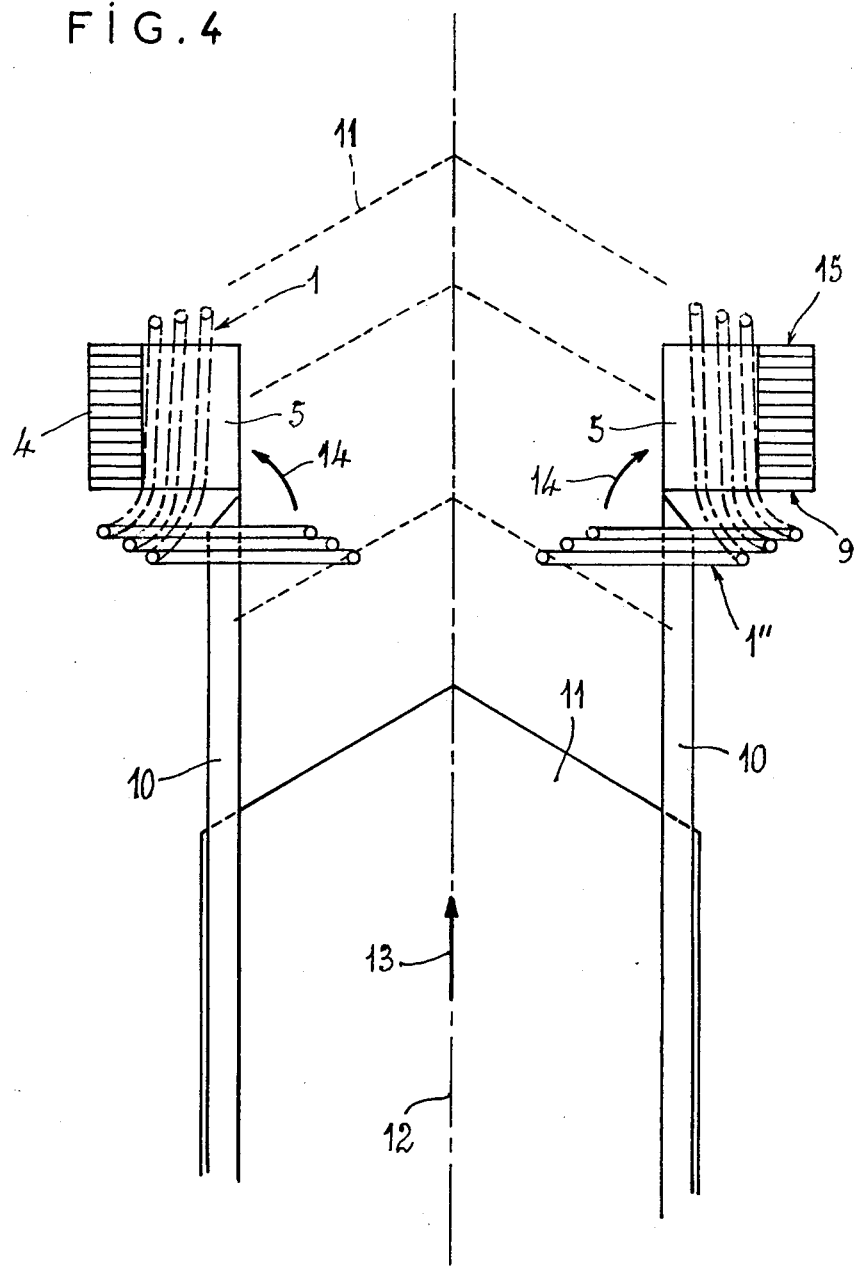
FIG. 4 is a diagrammatic view, of a section passing through the axis of the stator, illustrating the operation of the placement of the wires in the notches by tilting, and showing the mandrel used for this purpose.

The coil preformed into star 1" is then moved, by automatic means, against an end face 9 of the bundle of sheets 4, as the sketch shows in continuous lines in FIG. 4; these means can include, among other structures, pins 10 for guiding the coil. Then a mandrel 11 ending as a cone is inserted. The mandrel 11 is movable along axis 12 of the stator and moving from its low position, is pushed in the direction of the arrow 13 to be introduced through the bundle of sheets 4. There are shown, in dotted lines, two intermediate positions and the final high position of this mandrel 11 during its advance. The displacement of the mandrel 11 causes, as illustrated by the arrows 14, a tilting or rotating of the arms of the coil 1", which was preformed into an undulating star shape. This coil is thus deformed outside its plane, in the direction of the other end face 15 of the bundle of sheets 4, in such a way that certain sections of the wires are moved in a direction parallel to the axis 12 and inserted into notches 5 of the bundle of sheets 4. Thus, as the sketch shows by mixed lines in FIG. 4, there is obtained the winding corresponding to one of the phases 1 of the stator, the sections of the wires which are not inserted into the notches 5 forming the bundles of winding.

To make the complete undulating winding having the three phases 1, 2, 3, of FIG. 1, it is possible simultaneously to put these three phases into the corresponding notches 5 into position by the tilting operation which has just been described for a single phase.

It is understood that the invention is not limited to the embodiments described above, but also includes all variations made following the same principle; thus, in particular, the configuration of the coil preformed into an undulating star shape is variable according to the characteristics desired for the winding and in the device for the operation of the process, the various means indicated can be replaced by any equivalents.

We claim:

1. A process for making the winding of a stator, more especially an alternator stator for motor vehicles, comprising the steps of:

forming a flat circular coil having a desired number of turns externally of the stator for each phase of said alternator, preforming the coil externally of the stator into an undulating star shape with the undulations corresponding to the number of poles and notches of the stator, maintaining the coil in its substantially flat shape during said preforming step, inserting said coil into the notches of said stator, and preforming said inserting step by tilting selected portions of said preformed star shaped coil out of the plane of flatness of said coil established during said forming and preforming steps towards the other end face of said stator.

2. Process according to claim 1, wherein the placement by tilting of the wires in the notches of the bundle of sheets is simultaneous, for each of the coils corresponding to the different phases of the stator.

3. Process according to either claim 1 or 2, wherein the coil is initially formed in a conical shape, to obtain spaced winding bundles.

4. Process according to either claim 1 or 2, wherein the closing keys of the notches are automatically and simultaneously positioned by the insertion of the wires in the notches by tilting.

* * * * *